United States Patent [19]
Nakano et al.

[11] Patent Number: 5,640,627
[45] Date of Patent: Jun. 17, 1997

[54] DISPLAY DEVICE IN A CAMERA FINDER

[75] Inventors: Satoshi Nakano; Tomoaki Itabashi, both of Tokyo, Japan

[73] Assignee: Asahi Kogaku Kogyo Kabushiki Kaisha, Tokyo, Japan

[21] Appl. No.: 509,427

[22] Filed: Jul. 31, 1995

Related U.S. Application Data

[63] Continuation of Ser. No. 269,684, Jul. 1, 1994, abandoned.

[30] Foreign Application Priority Data

Jul. 2, 1993 [JP] Japan ..................... 5-164379

[51] Int. Cl.$^6$ ............................................ G03B 17/20
[52] U.S. Cl. ............................................ 396/296
[58] Field of Search .......................... 354/219, 222, 354/289.12, 289.1, 289.11, 223, 465, 471, 474; 396/296

[56] References Cited

U.S. PATENT DOCUMENTS

| | | | |
|---|---|---|---|
| 4,135,795 | 1/1979 | Uno et al. | 354/23 D |
| 4,198,148 | 4/1980 | Tano | 354/289 |
| 4,265,526 | 5/1981 | Ueda et al. | 354/106 |
| 4,376,575 | 3/1983 | Someya et al. | 354/155 |
| 4,436,397 | 3/1984 | Kobayashi | 354/53 |
| 4,639,111 | 1/1987 | Harvey | 354/481 |
| 4,801,793 | 1/1989 | Vaynshteyn | 354/289.12 |
| 5,111,228 | 5/1992 | Hansen | 354/222 |
| 5,122,827 | 6/1992 | Saegusa et al. | 354/410 |
| 5,128,702 | 7/1992 | Ogawa et al. | 384/106 |
| 5,229,801 | 7/1993 | VanDeMoere | 354/222 |
| 5,239,337 | 8/1993 | Takagi et al. | 354/443 |
| 5,245,375 | 9/1993 | Ohshita | 354/219 |
| 5,258,795 | 11/1993 | Lucas | 354/289.12 |

FOREIGN PATENT DOCUMENTS

| | | |
|---|---|---|
| 0063635 | 3/1991 | Japan . |
| 3252644 | 11/1991 | Japan . |

*Primary Examiner*—Safet Metjahic
*Assistant Examiner*—Nicholas J. Tuccillo
*Attorney, Agent, or Firm*—Greenblum & Bernstein, P.L.C.

[57] ABSTRACT

A display device for a camera finder include a display for displaying data, a position sensor which outputs a signal that is dependent on an orientation of the camera finder, and a controller for controlling the display such that the data is displayed along one of several predetermined directions. The predetermined direction that is selected depends on the output signal of the position sensor.

18 Claims, 6 Drawing Sheets

5,640,627

DISPLAY DEVICE IN A CAMERA FINDER

This application is a continuation of application Ser. No. 08/269,684, filed Jul. 1, 1994, now abandoned.

BACKGROUND OF THE INVENTION

The present invention relates to a display device located in camera finder.

Recently, cameras have been manufactured with finders that can display information related to the operation of the camera. For instance, the shutter speed, aperture value, exposure compensation etc., can be displayed, to allow the photographer to quickly determine these parameters while looking through the finder.

In these cameras, the photographing information is displayed having a predetermined orientation. For example, in a 35 mm compact camera, or a single lens reflex camera, the photographing information is displayed to have a proper orientation (i.e., a normal reading orientation) when the camera is oriented to take a landscape picture. However, when the camera is rotated so that a portrait picture is to be taken, the displayed data has the same orientation with respect to the finder, as it has when a landscape picture is to be taken; therefore, the displayed data is also rotated, and does not have the proper orientation. Thus, for the photographer, the displayed data is not easy to read when the camera is not arranged to take a landscape picture.

SUMMARY OF THE INVENTION

It is therefore an object of the present invention to provide an improved displaying device for a camera capable of displaying photographing information that is easy to read, even if the camera is not oriented in the landscape position. For the above object, according to an aspect of the present invention, there is provided a display device for a camera finder which includes:

a display mechanism for displaying data, the display mechanism being capable of displaying the data along at least two predetermined directions of the display device;

a position sensing mechanism for outputting a signal according to an orientation of the camera finder relative to a gravitational axis; and a control mechanism for controlling the display device to display the data along one of the at least two predetermined directions in accordance with the output signal.

According to another aspect of the present invention, there is provided a display device which includes:

a display panel provided with a plurality of segments, in which the plurality of segments are arranged so that data can be displayed along either one of at least two predetermined directions of the display device; and a control mechanism for controlling the display device to display the data along one of the at least two predetermined directions, in accordance with a predetermined signal orientation of the display.

BRIEF DESCRIPTION OF THE ACCOMPANYING DRAWINGS

FIG. 5 shows the LCD panel with all the segments turned ON;

DESCRIPTION OF THE EMBODIMENTS

Figure 1:
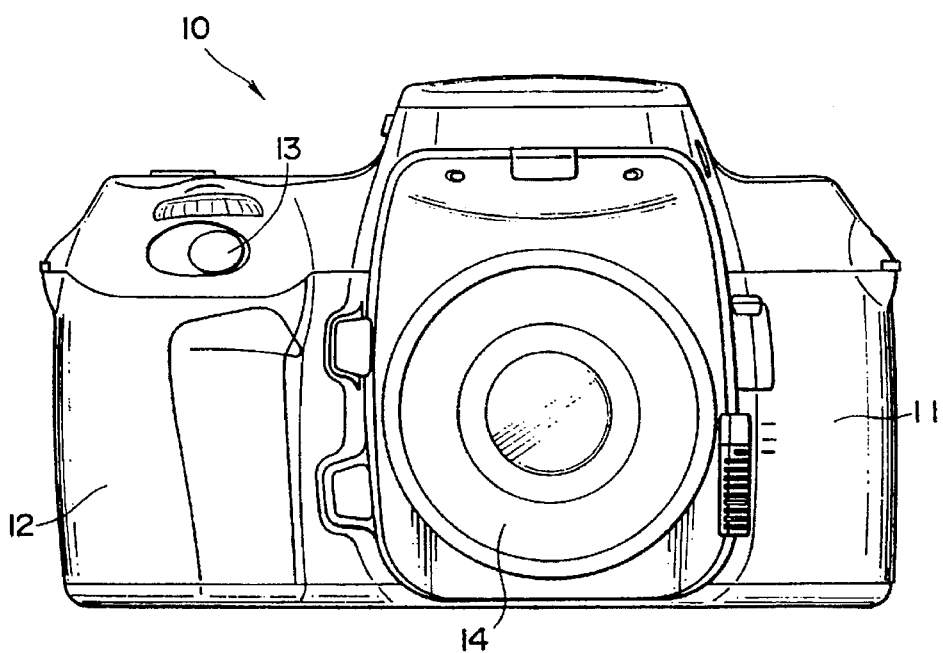
FIG. 1 is a front view of an electronically controlled single lens reflex camera embodying the present invention.

FIG. 1 is a front view of an electronically controlled single lens reflex camera 10 to which a display device embodying the present invention is employed. The camera 10 consists of a camera body 11 and an exchangeable lens 14. A grip 12 is formed on one side of the camera body 11 (at the left as shown in FIG. 1). A release button 13 is provided on the upper surface of the grip 12. When the release button 13 is depressed halfway, a photometry and distance measuring operation are initiated. When the release button 13 is fully depressed, a shutter of the camera is released.

Figure 2:
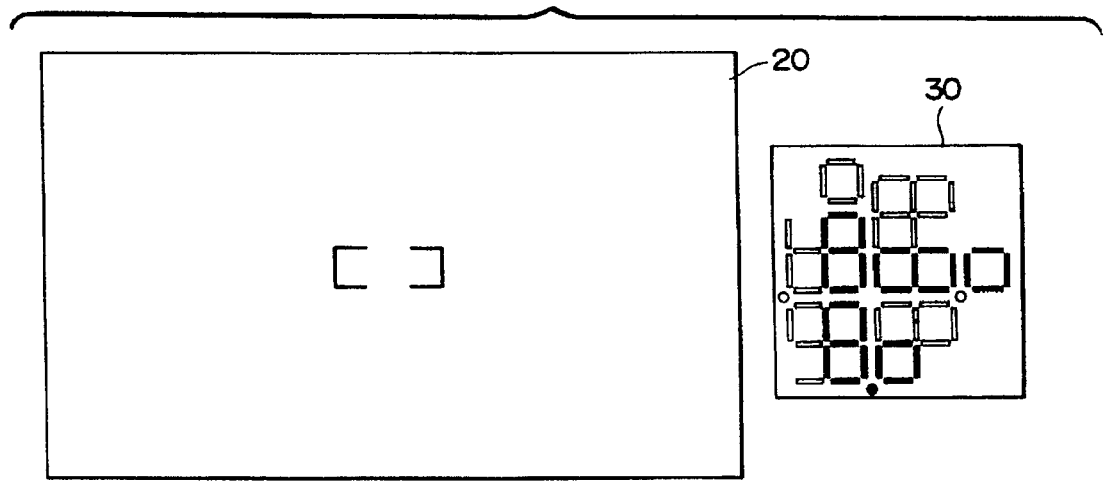
FIG. 2 shows a arrangement of a finder field and an LCD (Liquid Crystal Display) panel when the camera is oriented in a landscape position.

FIG. 2 shows an arrangement of a finder field 20 and a LCD (Liquid Crystal Display) panel 30 of the camera body 11. As shown in FIG. 2, the LCD panel 30 is located on one side of the finder field 20 (on the right side as shown in FIG. 2). The LCD panel 30 displays various photographing parameters related to the photographing operation. The information is displayed using a combination of seven-segment displays, with the segments being turned ON or OFF to form the appropriate alphanumeric. In FIG. 2, a number "8000" representing a shutter speed of 1/8000 second, and a number "8.0" representing an aperture value are displayed.

FIG. 2 shows the camera body 11 oriented in a landscape position. The segments of the LCD panel 30 are arranged such that the photographing information can be displayed having the proper orientation (i.e., normal reading orientation).

Figure 3:
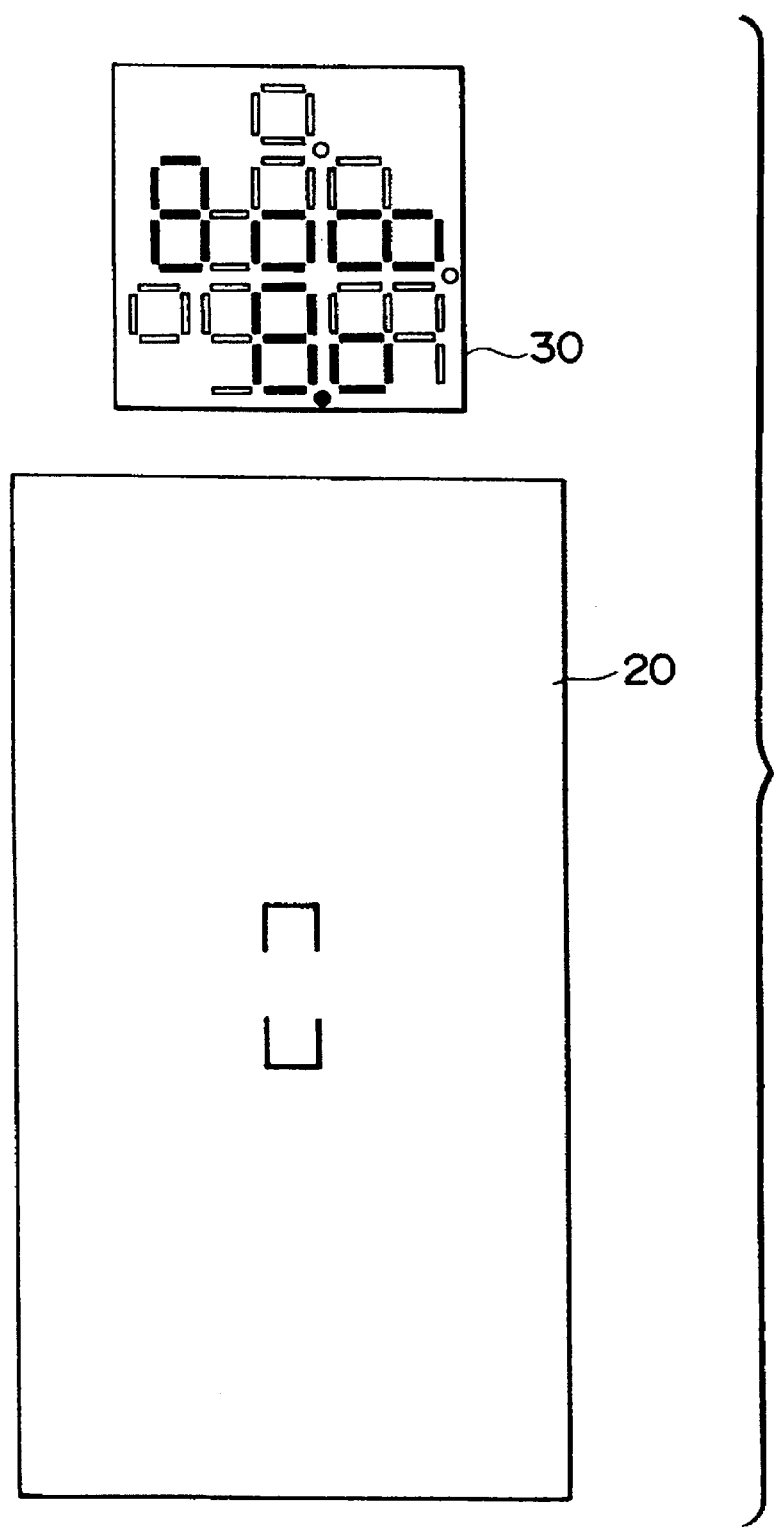
FIG. 3 shows the finder field and the LCD panel when the camera is oriented in a first portrait position.

FIG. 3 shows the camera body 11 rotated 90° counter-clockwise with respect to FIG. 2, in a first portrait position (i.e., the camera 10 is oriented such that the grip 12 is located above the lens 14). However, by selecting a proper combination of segments to turn ON, the information can be displayed having the proper orientation.

Figure 4:
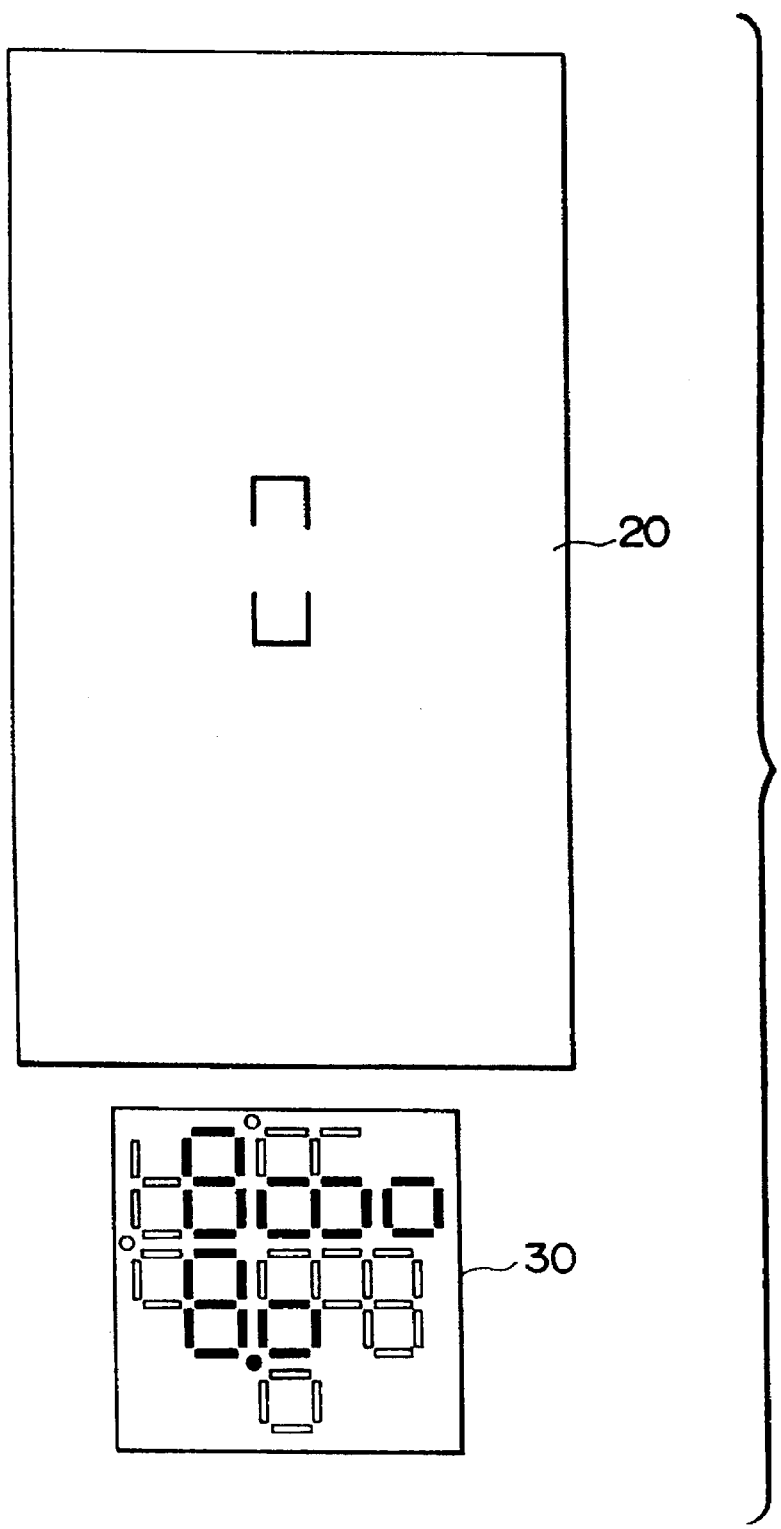
FIG. 4 shows the finder field and the LCD panel when the camera is oriented in a second portrait position.

Similarly FIG. 4 shows the camera body 11 rotated 90° clockwise with respect to FIG. 2, in a second portrait position (i.e., the camera 10 is oriented such that the grip 12 is located below the lens 14). Likewise, by selecting a proper combination of segments to turn ON, the information can also be displayed having the proper orientation (i.e., normal reading orientation).

Figure 5:
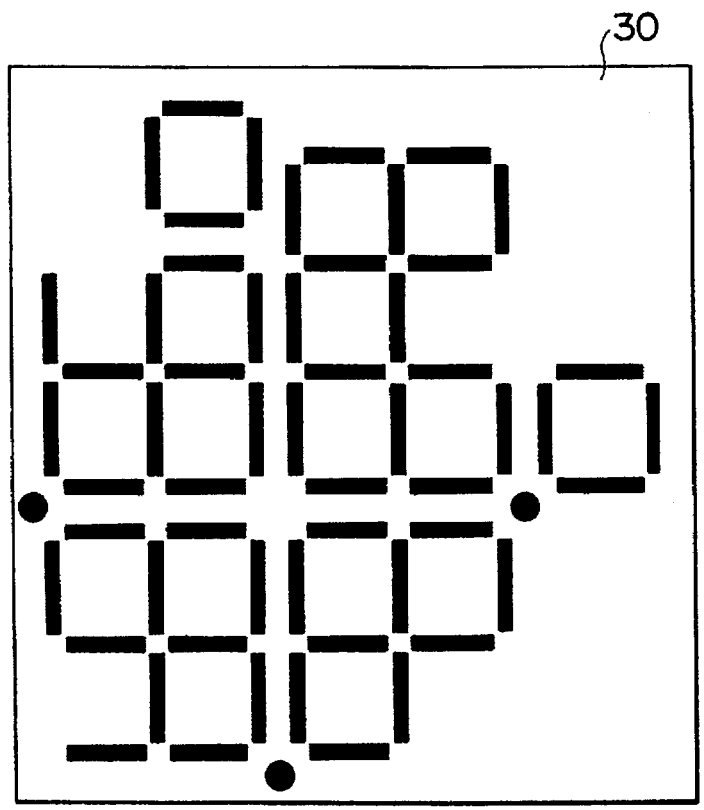

FIG. 5 shows the LCD panel 30 with all the segments turned ON. With this arrangement of the segments, the information can be displayed having the proper orientation (i.e., normal reading orientation), regardless of whether the camera body 11 is oriented in the landscape, first portrait, or second portrait position.

The camera body 11 is provided with a position sensor 40 (FIG. 6) for detecting the position of the camera body 11 with respect to the direction of gravity.

Figure 6:
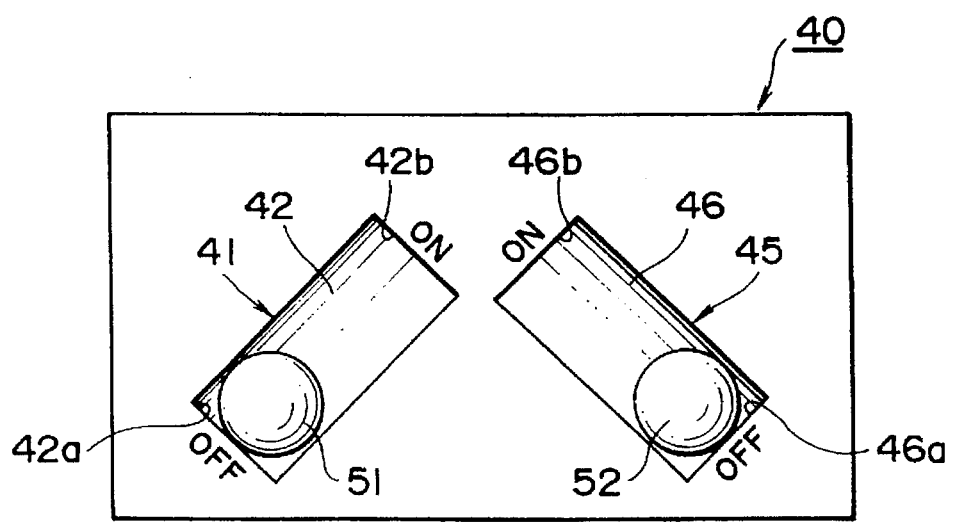
FIG. 6 shows a schematic front view of a position sensor.

FIG. 6 shows a schematic view of the sensor 40 viewed from the front side of the camera body 11, when the camera body 11 is oriented in the landscape position. The sensor 40 has a first switch 41 and a second switch 45. The first switch 41 and the second switch 45 respectively have guide grooves 42 and 46, which are inclined at +45° and −45°, respectively, with respect to the vertical direction.

Switching balls 51 and 52 are movably provided in the guide grooves 42 and 46, respectively. When the ball 51 contacts an edge 42a of groove 42, switch 41 is turned OFF. When the ball 51 contacts another edge 42b, switch 41 is turned ON. Similarly, when the ball 52 contacts edges 46a of groove 46, switch 45 is turned OFF, and when the ball 52 contacts another edge 46b, switch 45 is turned ON.

When the camera body 11 is oriented in the landscape position, switches 41 and 45 are both turned OFF, as shown in FIG. 6. When the camera body 11 is oriented in the first portrait position, switch 41 is turned ON and switch 45 is turned off. When the camera body 11 is oriented in the second portrait position, switch 41 is turned OFF and switch 45 is turned on. If the camera body 11 is oriented in the landscape position but is up-side-down, both the first and second switches 41 and 45 are turned ON. Thus, from the status of the switches 41 and 45, the position of the camera can be detected.

Figure 7:
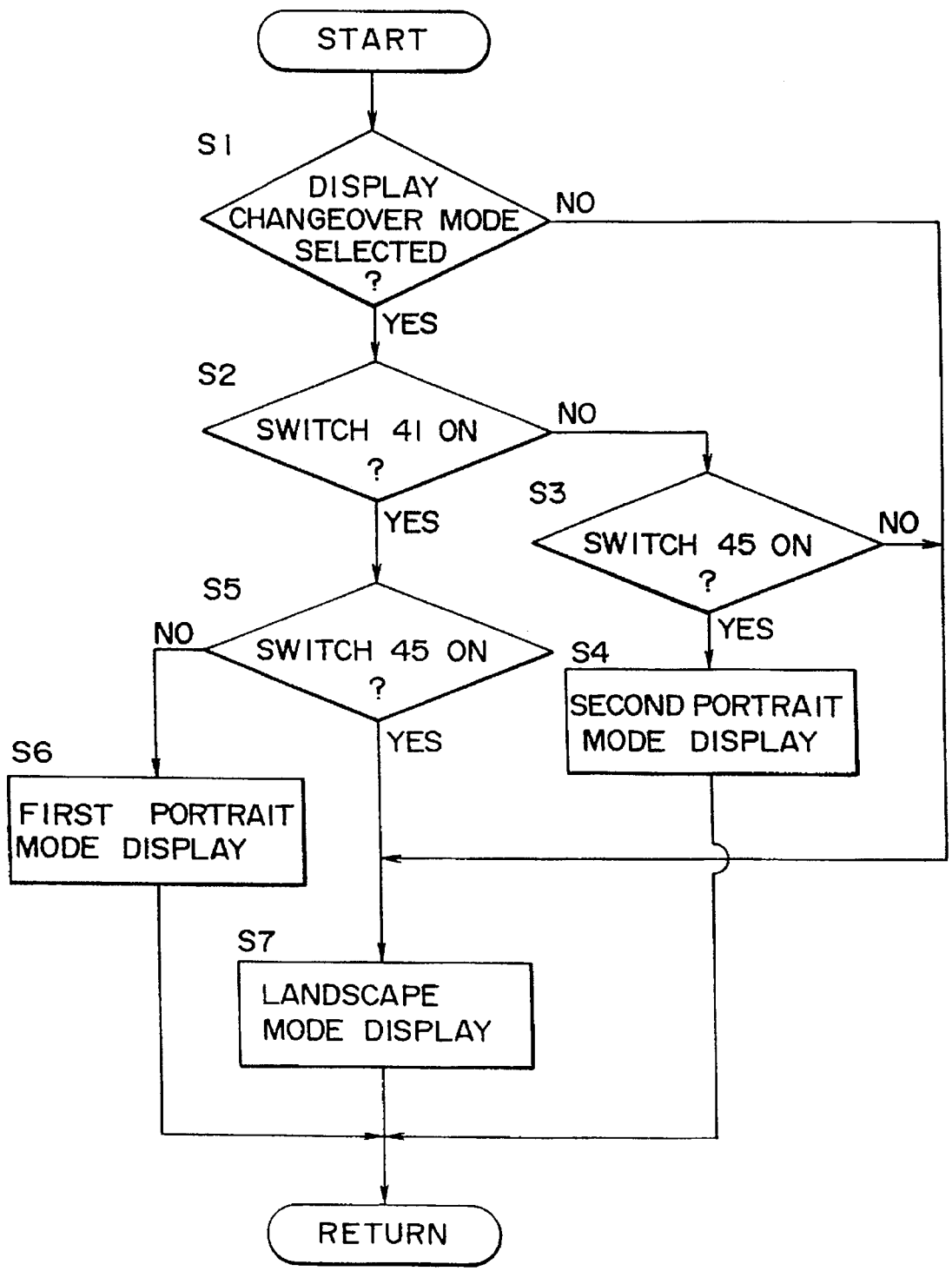
FIG. 7 shows a flowchart for controlling the displaying of the photographing information in accordance with the position of the camera.

FIG. 7 shows a control for displaying the photographing information in accordance with the orientation of the camera body 11.

The camera 10 is operable in two modes. The first mode or display changeover mode, is a mode in which the alphanumeric photographing information displayed on the LCD panel 30 is displayed always (i.e., normal reading orientation) having the proper orientation, for each of the landscape position, first portrait position and second portrait position. The second mode, or normal mode, is a mode in which the alphanumeric photographing information is always displayed having the proper orientation for the landscape position of the camera body 11, regardless of the orientation of the camera body 11.

At step S1, it is determined whether the display changeover mode has been selected. If the display changeover mode has been selected (S1: YES), control goes to S2, otherwise, control goes to S7, where the landscape mode display is set.

As shown in FIG. 7, there are four possible combinations of settings for the two switches 41 and 45. If Switch 41 is ON (S2: YES) and Switch 45 is OFF (S5: NO), then control goes to S6, where the first portrait mode display is set.

If Switch 41 is OFF (S2: NO) and Switch 45 is OFF (S5: NO), then control goes to S7, where the landscape mode display is set.

If Switch 41 is OFF (S2: NO) and Switch 45 is ON (S3: YES), then control goes to S4, where the second portrait mode display is set.

If Switch 41 is ON (S2: YES) and Switch 45 is ON (S3: YES), then control goes to S7, where the landscape mode display is set. This is because it is assumed that the camera 10 will not normally be oriented in an up-side-down landscape position, unless the photographer is also up-side-down. Therefore, the photographing information is displayed as if the camera 10 was in the normal landscape position.

In the above-described embodiment, a single LCD panel 30 having a plurality of segments, is employed. As shown in FIGS. 2, 3 and 4, some of the segments are commonly used when data is displayed, regardless of the orientation of the camera finder. For example, the segments used to display the "0" adjacent to the "8" in the number "8000" in FIG. 2, are also used to display the "0" adjacent to the "8" in the number "8000" in FIG. 3. Therefore, by using common segments to display data for each orientation, the total number of segments used can be decreased, thereby simplifying the circuitry used in the display device.

Figure 8:
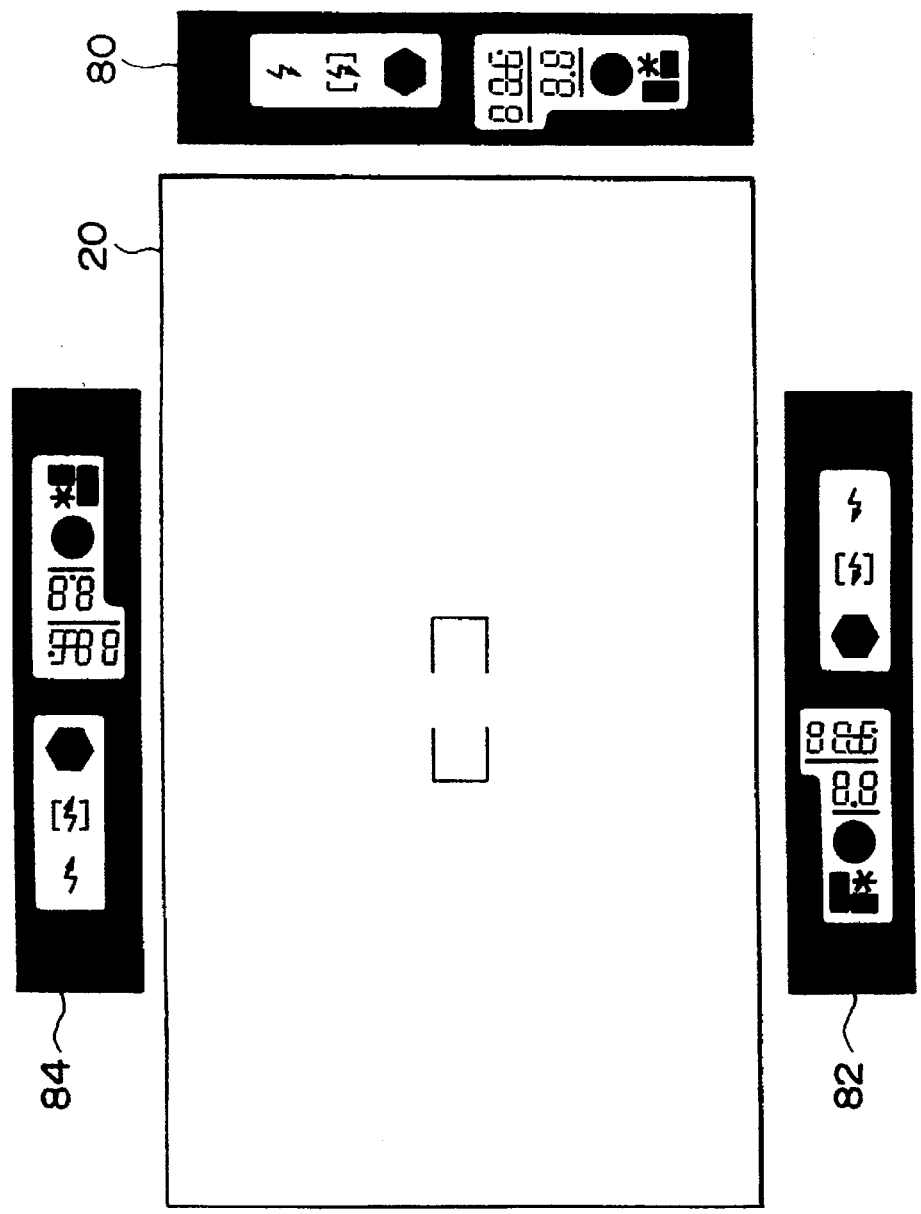
FIG. 8 shows a second embodiment according to the present invention.

In the above-described embodiment, the parameters are displayed in various directions on the same LCD panel 30 according to the camera position. However, the invention is not limited to this arrangement. FIG. 8 shows a second embodiment according to the present invention.

In the second embodiment shown in FIG. 8, there are three LCD panels 80, 82 and 84, respectively, provided on three side of the finder field 20, (i.e., the right, lower and upper sides as shown in FIG. 8). The LCD panels 80, 82 and 84 can display the same information, however the panels 80, 82 and 84 are arranged differently.

When the camera body 11 is oriented in the landscape position, only the LCD panel 80 is actuated to display the photographing information. When the camera body 11 is oriented in the first portrait position, the LCD panel 82 is actuated. When the camera body 11 is oriented in the second portrait position, the LCD panel 84 is actuated. Thus, for each orientation of the camera body 11, the LCD panel to the right of the finder field 20, is actuated to display the photographing information.

In the above description, the same display is actuated when the camera body 11 is oriented in the landscape, right-side-up, or left-side-up position, according to the first embodiment; and, three different displays can be selectively actuated depending on the orientation of the camera in the landscape, right-side-up or left-side-up position, according to the second embodiment. However, according to the present invention, it is also possible to provide an extra LCD panel that is actuated when the camera is oriented in the up-side-down landscape position.

The invention is applied to a single lens reflex camera in the above description. However, the invention can be applied to any type of camera having a finder system.

Further, the display device is not limited to an LCD panel having a plurality of segments. The present invention may be use any type of display device.

In addition, the position sensor described above is only an example, and any type of sensor which detects position with respect to gravity can be employed.

As described above, according to the arrangement of the segments of the LCD panel 30, information can be displayed in the camera finder having the proper orientation, regardless of the orientation of the finder.

The present disclosure relates to subject matter contained in Japanese Patent Application No. HEI 5-164379 filed on Jul. 2, 1993, which is expressly incorporated herein by reference in its entirety.

What is claimed is:

1. A display device for a camera finder, said display device comprising:

display means for displaying alphanumeric data, said display means comprising a plurality of display segments selectively actuatable to display alphanumeric characters and being capable of displaying said alphanumeric data oriented along at least two predetermined directions of said display device, at least one display segment of said plurality of display segments being operative to display alphanumeric data in each of said two predetermined directions;

position sensing means for outputting a signal according to an orientation of said camera finder relative to a gravitational axis; and control means for controlling said plurality of display segments of said display means to display said alphanumeric data along one of said at least two predetermined directions in accordance with said output signal of said position sensing means.

2. The display device according to claim 1, common segments of said plurality of segments being controlled to display a portion of said alphanumeric data along one of said at least two predetermined directions, and some of said plurality of segments being controlled to display another portion of said alphanumeric data along another of said at least two predetermined directions.

3. The display device according to claim 1, common segments of said plurality of display sgments being controlled to display a portion of said alphanumeric data regardless of which of said at least two predetermined directions said data is displayed along.

4. The display device according to claim 1, said position sensing means distinguishing four orientations of said display device.

5. The display device according to claim 1, said control means orienting said displayed alphanumeric data horizontally and upright within a view finder of a camera when said camera is positioned in two vertical orientations and in a horizontal orientation.

6. The display device according to claim 1, only display segments operative to display alphanumeric data in a selected one of said at least two predetermined directions of said display device being illuminated in said selected one of said at least two predetermined directions.

7. The display device according to claim 1, said display means displaying said alphanumeric data oriented along three predetermined directions of said display device.

8. The display device according to claim 1, said at least two predetermined directions comprising a first direction and a second direction perpendicular to said first direction, said first direction being perpendicular to said gravitational axis when said camera finder has a predetermined orientation.

9. The display device according to claim 3, said camera finder having a rectangular finder field, and said predetermined orientation corresponding to an orientation of said camera finder in a landscape position.

10. A display device comprising:

a display panel comprising at least two display panel sections for displaying a same predetermined alphanumeric data along at least two sides of said camera finder, each of said at least two display panel sections comprising a plurality of display segments selectively actuatable to display alphanumeric data, said display segments of each of said at least two display panel sections being arranged so that displayed alphanumeric data is oriented along a selected one of at least two predetermined directions; and control means for controlling said display panel to actuate one of said display panel sections to display alphanumeric data, said displayed alphanumeric data oriented along one of said at least two predetermined directions in accordance with a predetermined orientation of said display device.

11. The display device according to claim 10, said display panel displaying said same predetermined alphanumeric data along three sides of said camera finder.

12. The display according to claim 10, said control means orienting said displayed alphanumeric data horizontally and upright within a viewfinder of a camera when said camera is positioned in two vertical orientations and in a horizontal orientation.

13. The display device according to claim 10, said display panel comprising three display panel sections positioned along three sides of said camera finder for selectively displaying said same predetermined alphanumeric data along three sides of said camera finder.

14. The display device according to claim 10, each of said at least two display panel sections being positioned adjacent a different side of an image display area of said camera finder.

15. The display device according to claim 10, said at least two display panel sections being positioned relative to an image field of said camera finder such that said alphanumeric data is displayed in one of said at least two display panel sections which has a predetermined positional relationship with respect to a said image field, in each of said plurality of orientations of said display device.

16. The display device according to claim 10, said alphanumeric data being displayed oriented along one of said at least two predetermined directions which is perpendicular to a gravitational axis.

17. The display device according to claim 10, further comprising position sensing means for outputting a predetermined signal in accordance with an orientation of said display device with respect to a gravitational axis.

18. The display device according to claim 17, said control means controlling said plurality of segments of one of said at least two display panel sections to display said alphanumeric data along one of said at least two predetermined directions in accordance with said predetermined signal.

* * * * *

UNITED STATES PATENT AND TRADEMARK OFFICE
CERTIFICATE OF CORRECTION

PATENT NO. :  5,640,627
DATED      :  June 17, 1997
INVENTOR(S):  S. NAKANO et al.

It is certified that error appears in the above-indentified patent and that said Letters Patent is hereby corrected as shown below:

At column 5, line 20 (claim 3, line 5), before "data" insert ---alphanumeric---.

At column 5, line 43 (claim 9, line 1), change "3," to ---8,---.

Signed and Sealed this

Thirtieth Day of December, 1997

Attest:

BRUCE LEHMAN

Attesting Officer

Commissioner of Patents and Trademarks